(12) United States Patent
Chen et al.

(10) Patent No.: US 8,543,361 B2
(45) Date of Patent: Sep. 24, 2013

(54) METHOD AND NON-TRANSITORY COMPUTER READABLE MEDIUM THEREOF FOR THERMAL ANALYSIS MODELING

(75) Inventors: Chien-Chang Chen, Taoyuan County (TW); Yu-Ting Cheng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 165 days.

(21) Appl. No.: 13/204,945

(22) Filed: Aug. 8, 2011

(65) Prior Publication Data

US 2012/0323539 A1   Dec. 20, 2012

(30) Foreign Application Priority Data

Jun. 14, 2011   (TW) .............................. 100120735 A

(51) Int. Cl.
*G06G 7/56* (2006.01)

(52) U.S. Cl.
USPC ....................................... 703/5; 703/2; 703/7

(58) Field of Classification Search
USPC ................................... 703/5, 2, 10
See application file for complete search history.

(56) References Cited

U.S. PATENT DOCUMENTS 8,082,137 B2 * 12/2011 Li et al. ............................ 703/13

OTHER PUBLICATIONS

Massoud Pedram and Shahin Nazarian, Thermal Modeling, Analysis and Management in VLSI Circuits: Principles and Methods, Aug. 2006, IEEE, pp. 1487-1501.*
Zhan et al., High-Efficiency Green Function-Based Thermal Simulation Algorithms, Sep. 2007, IEEE, pp. 1661-1674.*
Codecasa et al., A Rigorous Approach to Electro-Thermal Network Modeling, Aug. 2001, ECCTD, pp. 161-164.*
Chen et al. Equivalent Electro-thermal Circuit Model for Vertical-Cavity Surface- Emitting Lasers on Silicon Optical Bench,2009, Eda publishing,pp. 1-5.*
Bosch et al. Thermal Compact Models for Electronic Systems, 2002, IEEE, pp. 1-9.*

\* cited by examiner

*Primary Examiner* — Omar Fernandez Rivas
*Assistant Examiner* — Iftekhar Khan
(74) *Attorney, Agent, or Firm* — McClure, Qualey & Rodack, LLP

(57) ABSTRACT

A method and a non-transitory computer readable medium thereof for thermal analysis modeling are provided. The method includes establishing an electrothermal network π model on the basis of electronic modules of an electronic system to define a heat source, propagation paths and a common base of the electronic system. Observation points in the electronic system are defined, in which each observation point is located at an isothermal surface enclosing a volume surrounding a reference point, and where the reference point is the heat source or one observation point. A heat conduction temperature difference and a heat convection temperature difference are calculated according to a power density function, a thermal conductivity coefficient and a distance vector between the reference point and each observation point. A temperature distribution is established according to the heat conduction and the heat convection temperature difference and a defined temperature of the common base.

14 Claims, 5 Drawing Sheets

METHOD AND NON-TRANSITORY COMPUTER READABLE MEDIUM THEREOF FOR THERMAL ANALYSIS MODELING

RELATED APPLICATIONS

This application claims priority to Taiwan Application Serial Number 100120735, filed Jun. 14, 2011, which is herein incorporated by reference.

BACKGROUND

1. Technical Field

The present disclosure relates to a method to establish a model. More particularly, the present disclosure relates to a method and a non-transitory computer readable medium thereof for thermal analysis modeling.

2. Description of Related Art

The next generation of computer chips will continue the trend for more complexity than their predecessors by containing more and more electronic elements in a single chip. Hence, accurate thermal analysis modeling is crucial in the semiconductor chip design process to make sure that the chip will not be damaged during operation due to accumulated heat.

In order to perform thermal analysis and modeling, it is necessary to compute the temperature distribution in the chip, which is related to the temperature of each of the elements and connection means within the chip. However, using conventional analysis and modeling techniques, if a thorough analysis is performed on all the elements and connection means within the chip, the large number of computations and the high complexity make the process extremely time-consuming and high in cost.

Accordingly, what is needed is a method and a non-transitory computer readable medium thereof for thermal analysis modeling to establish a thermal analysis model quickly and efficiently. The present disclosure addresses such a need.

SUMMARY

An aspect of the present disclosure is to provide a method for thermal analysis modeling. The method comprises the steps as outlined in the sentences that follow. An electrothermal network $\pi$ model is established on the basis of a plurality of electronic modules of an electronic system to define a heat source, at least one propagation path and a common base of the electronic system. A plurality of observation points in the electronic system are defined, in which each of the observation points is located at an isothermal surface enclosing a volume surrounding a reference point, and the reference point is the heat source or one of the observation points. A heat conduction temperature difference or a heat convection temperature difference are calculated according to a power density function of the reference point, a thermal conductivity coefficient and a distance vector between the reference point and each of the observation points. A temperature distribution of the electronic system is established according to the heat conduction and the heat convection temperature differences and a defined temperature of the common base.

According to an embodiment of the present disclosure, when the reference point is the heat source, the heat conduction temperature difference is calculated according to the power density function, the thermal conductivity coefficient and the distance vector. The step of calculating the heat conduction temperature difference further comprises performing volume integration on the volume surrounding the reference point and surface integration on the isothermal surface enclosing the volume according to the power density function, the thermal conductivity coefficient and the distance vector. The power density function comprises a volume power density function qv and a surface power density function qs, the thermal conductivity coefficient comprises a volume thermal conductivity coefficient kv and a surface thermal conductivity coefficient ks, the location of each of the observation points is r, the location of the heat source is r', a unit normal vector of the isothermal surface is n̂, the surface is a, and the heat conduction temperature difference is expressed as:

$$\Delta T = (1/4\pi)*\int_v (qv/kv|\bar{r}-\bar{r}'|)dv' - (1/4\pi)*\oint_s (qs|\hat{r}-\hat{r}'|\cdot\hat{n}/ks|\bar{r}-\bar{r}'|)da'$$

According to another embodiment of the present disclosure, when the reference point is one of the observation points, the heat convection temperature difference is calculated according to the power density function, the thermal conductivity coefficient and the distance vector. The step of calculating the heat convection temperature difference further comprises performing surface integration on the isothermal surface enclosing the volume according to the power density function, the thermal conductivity coefficient and the distance vector. The power density function comprises a surface power density function qs, the thermal conductivity coefficient comprises a surface thermal conductivity coefficient ks, the location of each of the observation points is r, the location of the reference point is r', a unit normal vector of the isothermal surface is n̂, the surface is a, and the heat conduction temperature difference is expressed as:

$$\Delta T = (1/4\pi)*\oint_s (qs|\hat{r}-\hat{r}'|\cdot\hat{n}/ks|\bar{r}-\bar{r}'|)da'$$

According to yet another embodiment of the present disclosure, the space between the reference point and each of the observation points is a part of the propagation path, and at least one of the electronic modules is located at the space, in which the thermal conductivity coefficient is related to the material of the electronic modules.

According to still another embodiment of the present disclosure, the method further comprises establishing an equivalent electrothermal circuit model on the basis of the electronic modules and the electrothermal network $\pi$ model, in which the equivalent electrothermal circuit model comprises a plurality of heat resistances. The heat resistances are calculated according to the power density function, the thermal conductivity coefficient and the distance vector. The heat source has the highest temperature in the electronic system and the common base has the lowest temperature in the electronic system.

An aspect of the present disclosure is to provide a non-transitory computer readable medium storing a computer program having code to execute a method for thermal analysis modeling, in which the method comprises establishing an electrothermal network $\pi$ model is established on the basis of a plurality of electronic modules of an electronic system to define a heat source, at least one propagation path and a common base of the electronic system. A plurality of observation points in the electronic system are defined, in which each of the observation points is located at an isothermal surface enclosing a volume surrounding a reference point, where the reference point is the heat source or one of the observation points. A heat conduction temperature difference or a heat convection temperature difference are calculated according to a power density function of the reference point, a thermal conductivity coefficient and a distance vector between the reference point and each of the observation points. A temperature distribution of the electronic system is established according to the heat conduction and the heat convection temperature differences and a defined temperature of the common base.

According to an embodiment of the present disclosure, when the reference point is the heat source, the heat conduction temperature difference is calculated according to the power density function, the thermal conductivity coefficient and the distance vector. The step of calculating the heat conduction temperature difference further comprises performing volume integration on the volume surrounding the reference point and surface integration on the isothermal surface enclosing the volume according to the power density function, the thermal conductivity coefficient and the distance vector. The power density function comprises a volume power density function qv and a surface power density function qs, the thermal conductivity coefficient comprises a volume thermal conductivity coefficient kv and a surface thermal conductivity coefficient ks, the location of each of the observation points is r, the location of the heat source is r', a unit normal vector of the isothermal surface is n̂, the surface is a, and the heat conduction temperature difference is expressed as:

$$\Delta T = (1/4\pi) * \int_v (qv/kv|\vec{r}-\vec{r}'|)dv' - (1/4\pi) * \oint_s (qs|\hat{r}-\hat{r}'|\cdot \hat{n}/ks|\vec{r}-\vec{r}'|)da'$$

According to another embodiment of the present disclosure, when the reference point is one of the observation points, the heat convection temperature difference is calculated according to the power density function, the thermal conductivity coefficient and the distance vector. The step of calculating the heat convection temperature difference further comprises performing surface integration on the isothermal surface enclosing the volume according to the power density function, the thermal conductivity coefficient and the distance vector. The power density function comprises a surface power density function qs, the thermal conductivity coefficient comprises a surface thermal conductivity coefficient ks, the location of each of the observation points is r, the location of the reference point is r', a unit normal vector of the isothermal surface is n̂, the surface is a, and the heat conduction temperature difference is expressed as:

$$\Delta T = (1/4\pi) * \oint (qs|\hat{r}-\hat{r}'|\cdot \hat{n}/ks|\vec{r}-\vec{r}'|)da'$$

According to yet another embodiment of the present disclosure, the space between the reference point and each of the observation points is a part of the propagation path, and at least one of the electronic modules is located at the space, in which the thermal conductivity coefficient is related to the material of the electronic modules.

According to still another embodiment of the present disclosure, the method further comprises establishing an equivalent electrothermal circuit model on the basis of the electronic modules and the electrothermal network π model, in which the equivalent electrothermal circuit model comprises a plurality of heat resistances. The heat resistances are calculated according to the power density function, the thermal conductivity coefficient and the distance vector. The heat source has the highest temperature in the electronic system and the common base has the lowest temperature in the electronic system.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 7 is a diagram of isothermal surfaces of the electronic system while the lateral single laser is turned on;

DETAILED DESCRIPTION

Figure 1:
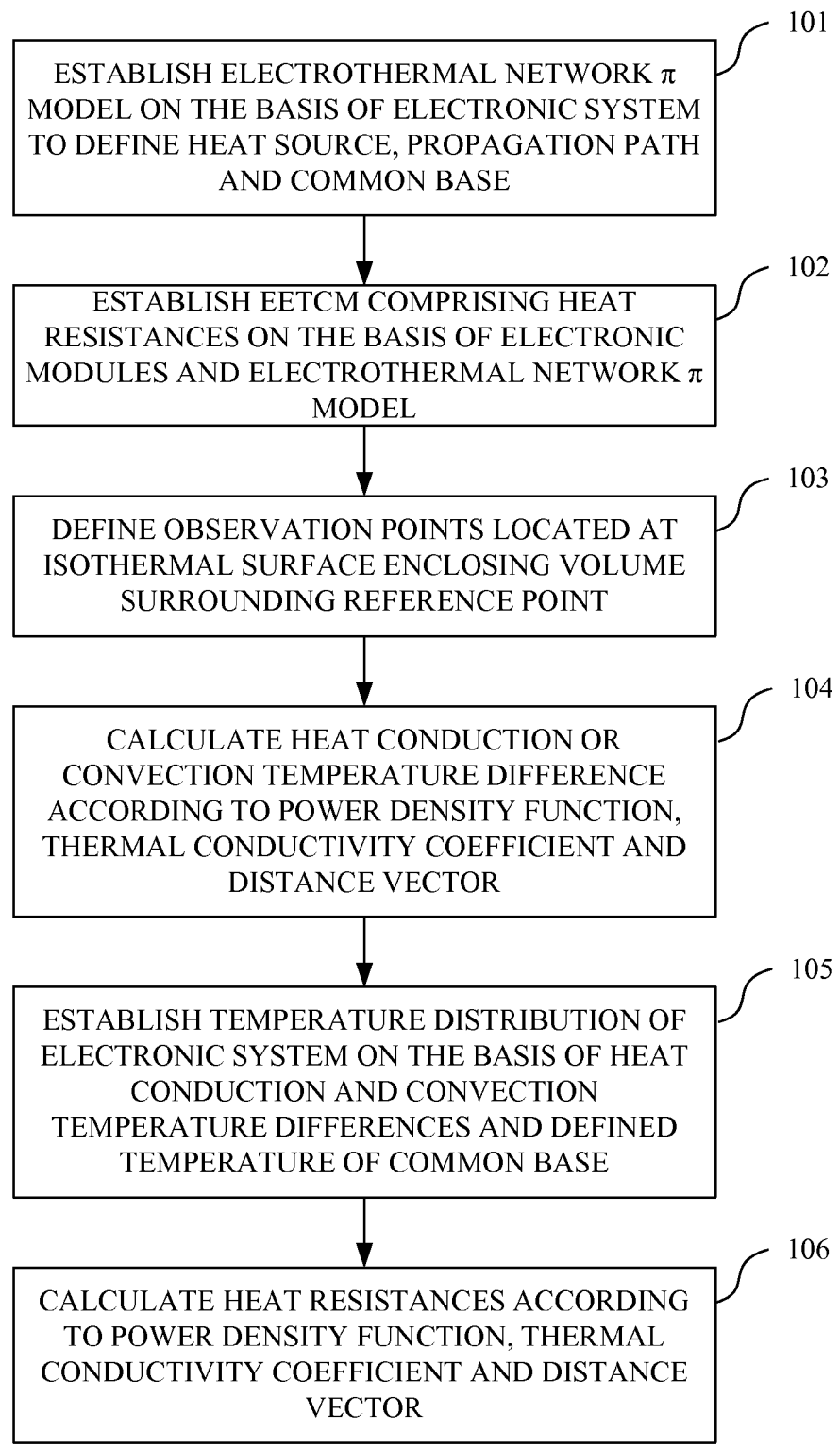
FIG. 1 is a flow chart of a method for thermal analysis modeling in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
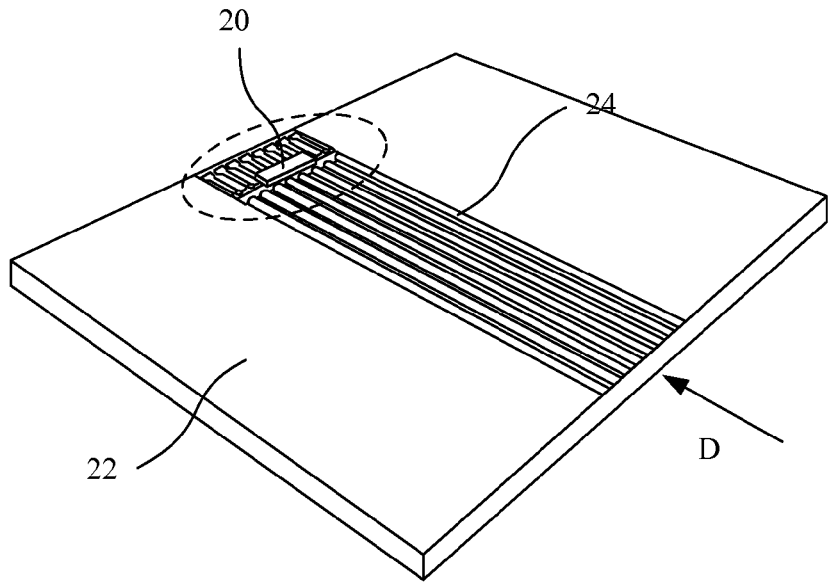
FIG. 2A is a 3D (three-dimensional) diagram of an electronic system of an embodiment of the present disclosure.

FIG. 1 is a flow chart of a method for thermal analysis modeling in an embodiment of the present disclosure. FIG. 2A is a 3D diagram of an electronic system 2 of an embodiment of the present disclosure. The method depicted in FIG. 1 can be used to establish a thermal analysis model of the electronic system 2 depicted in FIG. 2A. In an embodiment, the method can be executed by a non-transitory computer readable medium storing a computer program. The non-transitory computer readable medium can be a ROM (read-only memory), a flash memory, a floppy disc, a hard disc, an optical disc, a flash disc, a tape, a database accessible from a network, or any storage medium with the same non-transitory functionality that can be easily contemplated by people skilled in the art to which this disclosure pertains.

Figure 2B:
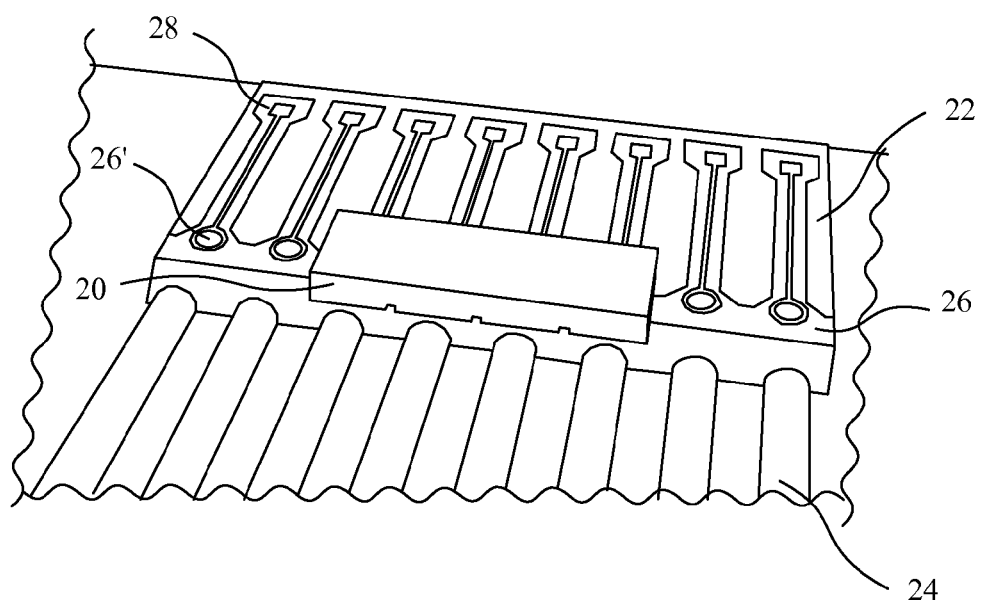
FIG. 2B is a side view of a part of the electronic system within a dotted-line section and along direction D in FIG. 2A.

In the present embodiment, the electronic system 2 comprises a vertical-cavity surface-emitting laser (VCSEL) 20. The number of channels of the VCSEL can be different in different embodiments. In the present embodiment, the VCSEL comprises four channels. With the computing speed of computers up to several GHz and above, the telecommunications bandwidth through traditional copper wire will be inadequate. Thus, incorporating optical light as a transmitting media will substantially improve most current interconnect technology due to its high transmission speed. A flip-chip bonding process can be applied to the vertical-cavity surface-emitting laser (VCSEL) 20 such that the VCSEL 20 is formed on a silicon optical bench (SiOB) 22 as a Gbps optical transmitter, where transmission lines are fabricated as electric interconnects. The SiOB 22 is fabricated with a V-groove or U-groove array (not shown) that can incorporate optical fibers 24 with itself. FIG. 2B is a side view of a part of the electronic system 2 within a dotted-line section and along direction D in FIG. 2A. As shown in FIG. 2B, a dielectric layer 26 is located under the VCSEL 20. A plurality of thermal vias 26' are formed on the dielectric layer 26 (the thermal vias under the VCSEL 20 are not shown). The thermal vias 26' are further connected to the contact pads 28 to dissipate heat to the external part of the electronic system 2.

Figure 3:
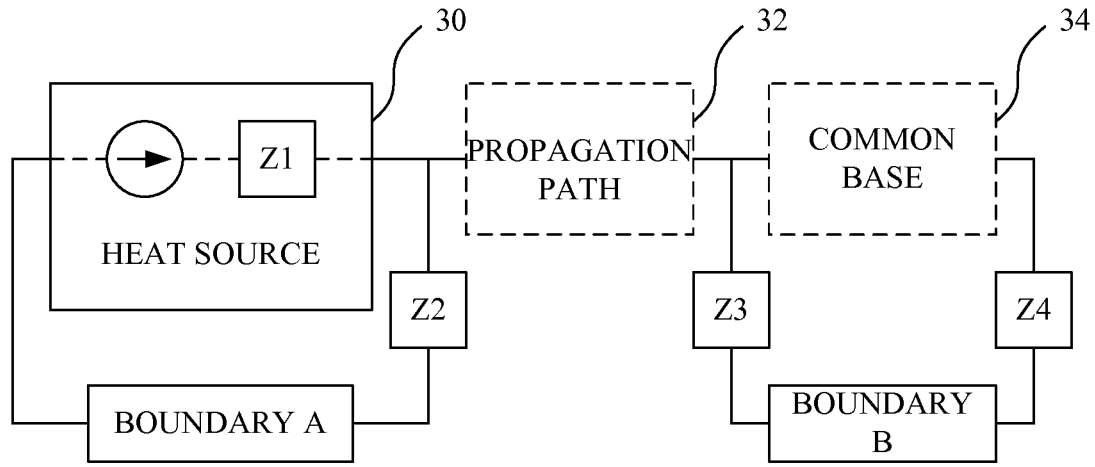
FIG. 3 is a diagram of an electrothermal network π model established on the basis of the electronic modules of the electronic system depicted in FIG. 2A.

Additional reference will be made to FIG. 3. In step 101 of the method depicted in FIG. 1, an electrothermal network π Fr model 3 as shown in FIG. 3 is established on the basis of the electronic modules of the electronic system 2. The electronic modules include the VCSEL 20, the SiOB 22, the optical fibers 24, the dielectric layer 26, the thermal vias 26', the contact pads 28 and other elements within the electronic system 2. The electrothermal network π model 3 can define a heat source 30, a propagation path 32 and a common base 34 of the electronic system 2. The dotted lines enclosing the blocks in the electrothermal network π model 3 shown in FIG. 3 represent adiabatic surfaces. The impedance parameters Zi, where i represents 1, 2, 3 and 4, can be defined as the thermal resistance of heating source itself, nature or forced air convection, thermal capacitance and other specified boundary conditions, etc. Boundaries A and B can be the common base of the thermal flows, external boundaries or interconnections between different systems. In general, the heat source 30 has the highest temperature in the electronic system 2 and the common base 34 has the lowest temperature in the electronic system 2. In the present embodiment, the heat source 30 is the VCSEL 20; the propagation path 32 includes the optical fibers 24, the dielectric layer 26, the thermal vias 26', the contact pads 28 and other elements; and the common base 34 is the SiOB 22.

Through the establishment of the electrothermal network π model 3, the corresponding thermal model of the electronic system 2 can be established rapidly to lower the complexity of the thermal analysis. Consequently, the thermal behavior of the electronic system 2 can be determined by evaluating the temperature distribution of the electronic system 2 using mathematical techniques. It should be appreciated that in other electronic systems, the electrothermal network π model established can be varied as needed and is not limited to the model shown in FIG. 3.

Figure 4:
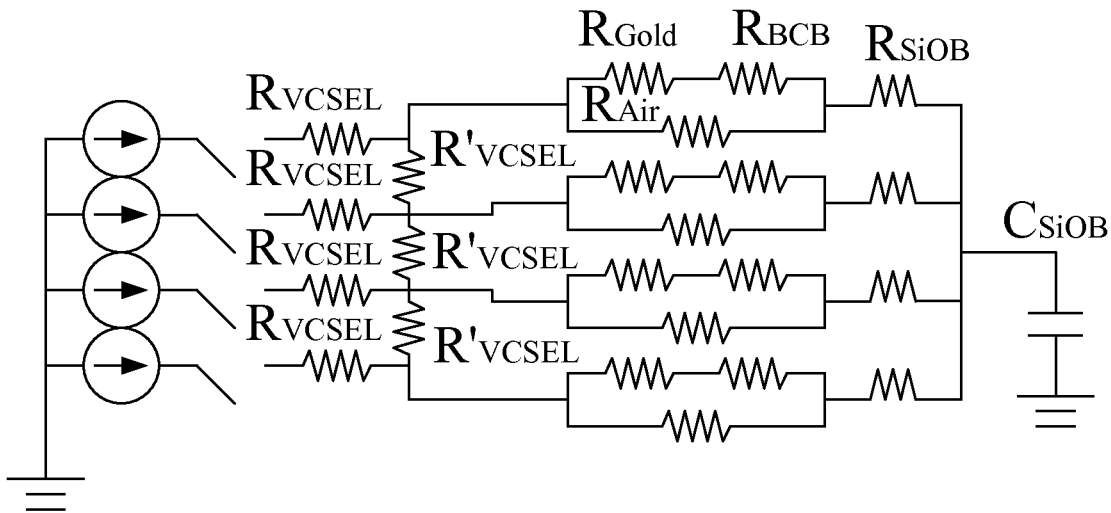
FIG. 4 is a diagram of an equivalent electrothermal circuit model established on the basis of the electronic modules of the electronic system depicted in FIG. 2A and the electrothermal network π model depicted in FIG. 3.

Referring to FIG. 4, in step 102 of the method depicted in FIG. 1, an equivalent electrothermal circuit model (EETCM) 4 is established on the basis of the electronic modules in the electronic system 2 depicted in FIG. 2A and the electrothermal network π Fr model 3 depicted in FIG. 3. The equivalent electrothermal circuit model 4 comprises a plurality of heat resistances.

The parameters Z1 and Z2, Z3, and Z4 are thermal resistances of the 3D stacked VCSEL ($R_{VCSEL}$ and $R'_{VCSEL}$ in FIG. 4), an infinite thermal resistance due to the negligence of natural air convection, and the thermal capacitance of SiOB ($C_{SiOB}$), respectively. Additionally, the blocks of propagated resistances are represented by a serial connection of gold ($R_{GOLD}$) and BCB ($R_{BCB}$) layers, which are connected in parallel with air ($R_{Air}$). The resistance of the common base 34 is the SiOB ($R_{SiOB}$). Four switches depicted in FIG. 4 adopted for the sources of thermal flow indicate that the channels of the VCSEL 20 can be individually operated. However, the thermal behavior within the heat source 30 is always more complicated than the other components. By realizing the requirement, the mathematical technique of the Green's theorem is adopted in the present disclosure to sufficiently and qualitatively describe the thermal characteristics of the optical transmitter.

Figure 5:
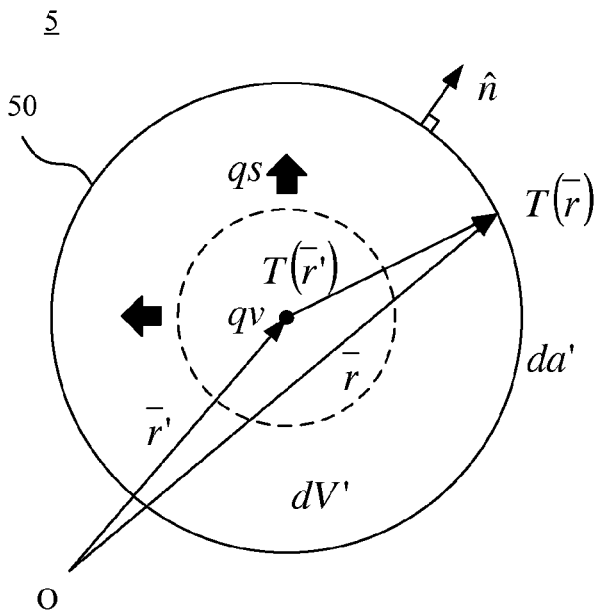
FIG. 5 is a diagram depicting the volume of interest of an embodiment of the present disclosure.

Green's theorem is a mathematical tool for dealing with the problems of specified boundary conditions fixing the field values at all points in a volume of interest. As long as field sources within the volume and net field flux on the surfaces enclosing the volume are known, the physical characteristics of the field inside the volume can be uniquely determined as well as the transfer properties on the surrounding surfaces. Starting from the second Green's theorem:

$$\int_v [\phi(\vec{r}')\nabla'^2\psi(\vec{r}')\nabla'^2\phi(\vec{r}')]dV' =$$

$$= \oint_s [\phi(\vec{r}')\nabla'\psi(\vec{r}') - \psi(\vec{r}')\nabla'\phi(\vec{r}')] \cdot \hat{n} da' \quad (1)$$

where $\phi(\vec{r}')$ and $\psi(\vec{r}')$ are two arbitrary scalar fields. The parameters $\vec{r}'$, V', $\hat{n}$, a' and are the position of the field source (the reference point), the volume of interest, the normal unit vector of the surrounding surface enclosing the volume, and the surrounding surface, respectively. In order to describe the temperature distribution of the thermal characteristics of the heating system by means of the Green's theorem, the two scalar fields should be artificially chosen:

$$\phi(\vec{r}') = 1/|\vec{r} - \vec{r}'| \quad (2)$$

$$\psi(\vec{r}') = T(\vec{r}') \quad (3)$$

where T and $\vec{r}$ are the temperature distribution and the observed point, respectively. FIG. 5 is a diagram depicting the volume of interest 5 of an embodiment of the present disclosure. It is pointed out that in the present embodiment, the volume of interest 5 is a sphere having a heat source at the center. As shown in FIG. 5, the points labeled as O, T($\vec{r}'$), T($\vec{r}$) and are the locations of the original point, the heat source (the reference point) and the observation point, respectively. Hence, the temperature at the observation point is affected by the heat source through heat conduction.

By substituting (2) and (3) into (1), and using the identity:

$$\nabla'^2 \phi(\vec{r}') = \nabla'^2(1/|\vec{r}-\vec{r}'|) = -4\delta(\vec{r}-\vec{r}') \quad (4)$$

the temperature distribution is then calculated as follows:

$$T(\vec{r}) = -(1/4\pi)\int_v (\nabla'^2 T(\vec{r}')/|\vec{r}-\vec{r}'|)dV' + (1/4\pi)\oint_s [(\nabla'^2 T(\vec{r}')/|\vec{r}-\vec{r}'|)dV' - T(\vec{r}')\nabla'(1/|\vec{r}-\vec{r}'|)] \cdot \hat{n} da' \quad (5)$$

For simplifying the prescribed boundary conditions, the surrounding surface a' can be assumed to be an isothermal surface. Thus, temperature distribution of the third term in (5) becomes a constant distribution, and the Green's theorem for the temperature distribution can be further modified as a temperature difference:

$$T(\vec{r}) - T(\vec{r}') \equiv \Delta T = -(1/4\pi)\int_v (\nabla'^2 T(\vec{r}')/|\vec{r}-\vec{r}'|)dV' + \quad (6)$$

$$(1/4\pi)\oint_s [(\nabla' T(\vec{r}')/|\vec{r}-\vec{r}'|) \cdot \hat{n} da'$$

The difference of temperature distribution for a heating system with prescribed boundary conditions may be clarified in detail by treating the volume and surface integrals in (6) carefully.

By analogy with the Poisson and electric field equations in a steady state, the thermal sources in the volume and surface integral in (6) can be modified as follows:

$$\nabla'^2 T(\vec{r}') = -qv/kv \quad (7)$$

and $$\nabla' T(\vec{r}') = -(qs/ks)(\hat{r}-\hat{r}') \quad (8)$$

where qv and qs are the volume power density in W/m$^3$ generated within the volume of interest and the surface power density in W/m$^2$ radiated from the surrounding surface, respectively. Moreover, kv and ks are the thermal conductivity in W/m·K for volume and surface integrals, respectively.

As the physical meanings of the conduction, the power densities mentioned in (7) and (8) represent the volume and surface densities of the thermal sources at specified points, respectively. By substituting (7) and (8) into (6), the difference of temperature distribution for the heat conduction can be derived as follows:

$$\Delta T = (1/4\pi) \int_v (qv/k v|\vec{r}-\vec{r}'|)dV' - (1/4\pi) \oint_s [(qs/k|\vec{r}-\vec{r}'|) \cdot \hat{n} da' \quad (9)$$

For constant power density and isotrope thermal conductivity, (9) can be further simplified by setting the field source on the original point:

$$\Delta T = (qv/Kv)|\vec{r}-\vec{r}'|^2 - (qs/Ks)|\vec{r}-\vec{r}'|(\hat{r}-\hat{e}') \cdot \hat{n} \quad (10)$$

Physically and conceptually, (10) can be simply treated as a one-dimensional problem by assuming 3 kv=ks=k and realizing the vector difference |r̂ to be the thermal conducting path ΔL, and it will become:

$$\Delta T = (qv/K)\Delta L^2 - (qs/K)\Delta L(\hat{r}-\hat{r}') \cdot \hat{n} \quad (11)$$

or $$k\Delta T/\Delta L = (qv/K)\Delta L - qs(\hat{r}-\hat{r}') \cdot \hat{n} = q\Delta L - q_n \quad (12)$$

Equation (11) indicates that the subtraction of the power density radiated from the surrounding surface from the power density generated within the volume of interest will be equal to the product of the temperature gradient and the thermal conductivity in one-dimension for the case in a steady state. In a source free volume, (12) becomes the so-called Fourier's law in heat conduction that also validates the correction of the equality assumption 3 kv=ks=k.

Meanwhile, the thermal resistances specified in the EETCM 4 as shown in FIG. 4 can be derived as follows:

$$R = [\beta q \int_V (dV'/|\vec{r}-\vec{r}'|) - q_n \oint_s (da'/|\vec{r}-\vec{r}'|)]/[4\pi k q_n \int_s (\hat{r}-\hat{r}') \cdot \hat{n} da'] \quad (13)$$

Figure 6:
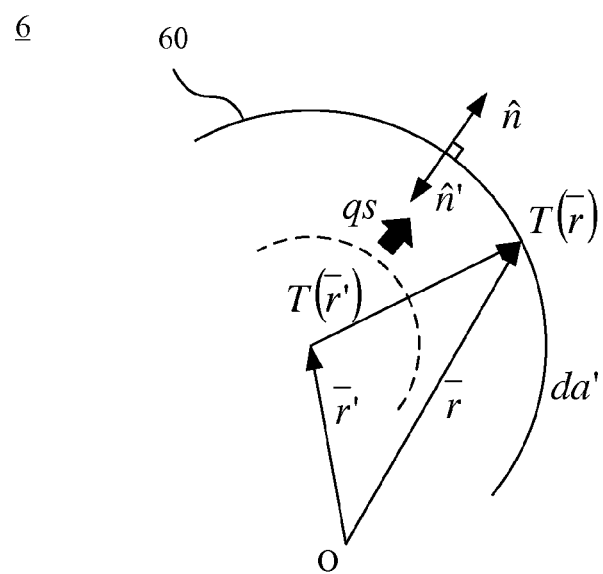
FIG. 6 is a diagram depicting the volume of interest of another embodiment of the present disclosure.

FIG. 6 is the volume of interest 6 of another embodiment of the present disclosure. It pointed out that in the present embodiment, the volume of interest 6 is a sphere without a heat source. As shown in FIG. 6, the points labeled as O, T(r̂'), and T∞ are the locations of the original point, the reference point and the observation point, respectively. Hence, the temperature at the observation point is affected by the heat source through heat convection.

By recalling (6) and considering that there is no power source in the mechanism of heat convection, the temperature difference resulted by the convection, as shown in FIG. 6, can be described as follows:

$$\Delta T = (1/4\pi) \oint_s [(\nabla'(\hat{r}')/|\vec{r}-\vec{r}'|) \cdot \hat{n} da \quad (14)$$

The surface 60 of heat convection mechanism could be extended to the surrounding, where the surface temperature T∞ remains a constant and is not be influenced by the internal heating systems. Thus, by substituting (8) into (14), the temperature distribution resulted by the heat convection can be obtained by the derived temperature difference. Using similar approaches of (10) and (11), the temperature difference can be simplified as follows:

$$\Delta T = -(qs/Ks)\Delta L|\vec{r}-\vec{r}'| \cdot \hat{n}' = qn/h \quad (15)$$

or $$qn = h\Delta T = h[T(\hat{r}') - T\infty] \quad (16)$$

where h is k/ΔL and called the convection heat transfer coefficient in W/m²·K. It is noted that there are three physical mechanisms of heat transfer for the heating system, i.e., conduction, convection and radiation. Fortunately, the radiation mechanism only can dominate at a very high temperature region, and therefore, the mechanism can be disregarded in cases concerning microelectronic systems.

Referring again to FIG. 1, in step 103, a plurality of observation points in the electronic system 2 are defined, in which each of the observation points is located at an isothermal surface enclosing the volume surrounding the reference point, and the reference point is the heat source or one of the observation points. Then in step 104, the heat conduction temperature difference and the heat convection temperature difference are calculated according to the power density function of the reference point, the thermal conductivity coefficient and the distance vector between the reference point and each of the observation points, where the heat conduction temperature difference can be calculated through (9) and the heat convection temperature difference can be calculated through (14). The space between the reference point and each of the observation points is a part of the propagation path, and at least one of the electronic modules including the optical fibers 24, the dielectric layer 26, the thermal vias 26' and the contact pad 28, etc., is located at the space. The thermal conductivity coefficient is related to the material of the electronic modules.

In step 105, a temperature distribution of the electronic system 2 is established according to the heat conduction and the heat convection temperature differences and a defined temperature of the common base 34, i.e., the lowest temperature of the electronic system 2. In an embodiment, the common base 34 is the heat sink of the electronic system 2 that is able to keep the temperature of the surface of the common base 34 at a fixed value as the lowest temperature of the electronic system 2. It is hard to determine the temperature of the heat source (VCSEL 20 in the present embodiment) directly. However, it is easy to derive the temperature distribution of the whole electronic system 2 from the known temperature of the common base 34 and the calculation of the heat conduction and the heat convection temperature differences.

In step 106, the heat resistances in FIG. 4 can be calculated according to the power density function, the thermal conductivity coefficient and the distance vector through the use of (13). Hence, if the space of the electronic system 2 is segmented into a plurality of larger unit volumes, the temperature distribution of the whole electronic system 2 can be rapidly determined through the steps described above. By segmenting the space of the electronic system 2 into smaller volumes, a more precise temperature distribution can be computed. However, the smaller the volumes are, the greater the complexity of the calculations is required. The EETCM 4 depicted in FIG. 4 may not satisfy precision of the complex calculation. Other algorithms can be used to perform the complex calculations. However, the concept is still based on the establishment of the electrothermal network π model and the computation of the heat conduction and convection. Those skilled in the art can easily make various modifications and variations without departing from the scope or spirit of the disclosure. It is further pointed out that the shape of the unit volume is not limited to the sphere described above. Different shapes of volumes such as a square cube or a trapezoid cube can be used as a unit volume to segment the space of the electronic system 2.

In an embodiment, the four-channel VCSEL is formed on a 625-um-thick SiOB, which is operated in air without having artificial convection. The bottom of the SiOB is an isothermal surface, where it is set at 75° C. to imitate the operating environment of a typical optical transceiver system. All other surfaces are adiabatic, where no heat flux is allowed, as mentioned by the EETCM for the thermal analysis. According to the presented EETCM, as shown in FIG. 4, the contributions of thermal resistances of air within the propagated resistances and that of SiOB within the common base resistances can be ignored, since they have a large thermal resistance value in the area of parallel connection and a small resistance value in the area of serial connection. The materials of air and SiOB may be reasonably removed in the calculation, and therefore, the requirements of CPU time and memory operation can be reduced.

Figure 7:
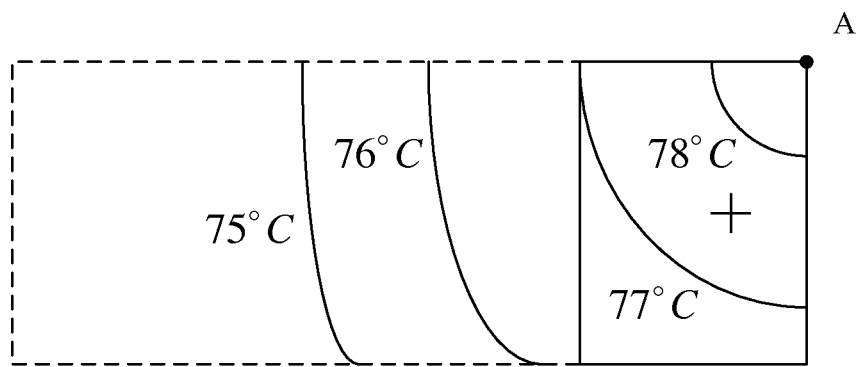

The value of the volume power density in the source can be obtained by means of the product of the input power of the VCSEL per volume and its efficiency:

$$qv=(I^2R_h/V_h)\eta \quad (17)$$

where I, $R_h$, $V_h$, and $\eta$ are the input current, electric resistance of the heating source, volume of the heating source, and the electricthermal energy transfer efficiency coefficient, respectively. FIG. 7 is a diagram of isothermal surfaces of the electronic system 2 while the lateral single laser is turned on. As shown in FIG. 7, the configuration of the isothermal surfaces reveals the probable location of the hottest spot A, where the heat source region is represented using the symbol "+." In the present embodiment, the input current is limited at 8 mA, and the electricthermal energy transfer efficiency is 85.7% to meet the standard specification of the semiconductor-made VCSEL. The theoretical temperature at the hottest spot is 78.4° C.

Figure 8A:
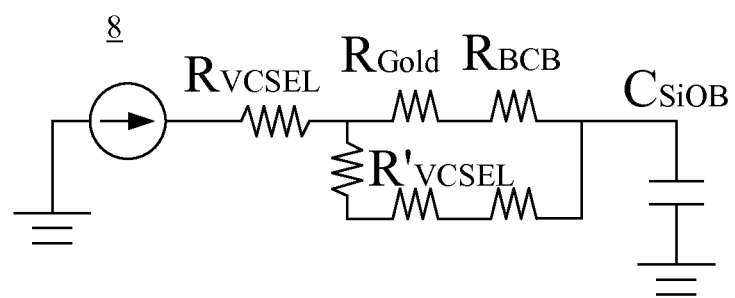
FIG. 8A is a diagram of an EETCM with a single operating channel after removing the air and SiOB in the thermal conducting system.

After determining the hottest spot within or on the surface of the heating source, the temperature distribution may then be determined using (9) and (14). The thermal resistance of each component can also be derived using (13). FIG. 8A is a diagram of an EETCM 8 with a single operating channel after removing the air and SiOB in the thermal conducting system. Since the VCSEL has a thermal conductivity that is lower than that of the thermal vias, and the thickness of the space between the operating VCSEL and the VCSEL adjacent thereto can be greater than that of the thermal vias by two orders of magnitude, the thermal vias would become the main path of the thermal flow.

Figure 8B:
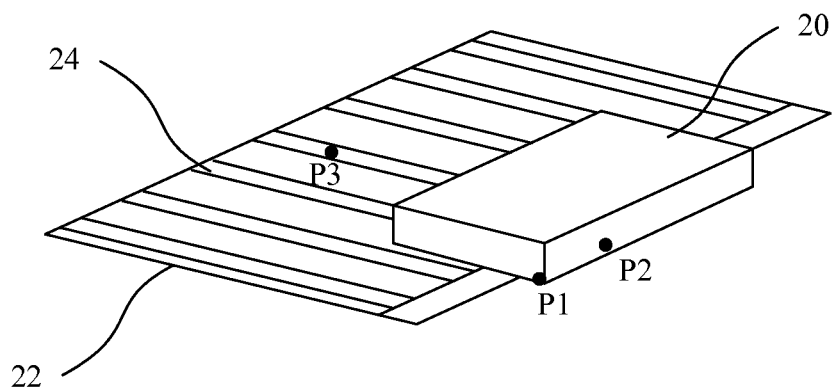
FIG. 8B is a diagram depicting the simulation results of the electronic system.

FIG. 8B is a diagram depicting the simulation results of the electronic system. The lateral VSCEL is operated with 8 mA input current and 2V bias voltage. The temperatures at node points P1, P2 and P3 are 78.9, 76.8 and 75° C., respectively. The hottest temperature at node P1 is close to the result that on the isothermal surfaces calculated by the EETCM, as shown in FIG. 7. The results reveal that the hottest temperature occurs at node P1 and the main path of thermal flow is from node P1 to P3. Therefore, the EETCM derived based on the electrothermal network π model can indeed provide a quick and accurate way to establish the model and analyze the thermal behavior of the electronic system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for thermal analysis modeling comprising:
establishing an electrothermal network π model on the basis of a plurality of electronic modules of an electronic system to define a heat source, at least one propagation path and a common base of the electronic system;
defining a plurality of observation points in the electronic system, wherein each of the observation points is located at an isothermal surface enclosing a volume surrounding a reference point, where the reference point is the heat source or one of the observation points;
calculating a heat conduction temperature difference or a heat convection temperature difference according to a power density function of the reference point, a thermal conductivity coefficient and a distance vector between the reference point and each of the observation points; and
establishing a temperature distribution of the electronic system according to the heat conduction and the heat convection temperature differences and a defined temperature of the common base,
wherein when the reference point is the heat source, the heat conduction temperature difference is calculated according to the power density function, the thermal conductivity coefficient and the distance vector,
wherein the step of calculating the heat conduction temperature difference further comprises performing volume integration on the volume surrounding the reference point and surface integration on the isothermal surface enclosing the volume according to the power density function, the thermal conductivity coefficient and the distance vector,
wherein the power density function comprises a volume power density function qv and a surface power density function qs, the thermal conductivity coefficient comprises a volume thermal conductivity coefficient kv and a surface thermal conductivity coefficient ks, the location of each of the observation points is r, the location of the heat source is r', a unit normal vector of the isothermal surface is n̂, the surface is a, and the heat conduction temperature difference is expressed as:

$$\Delta T=(1/4\pi)*\int_v(qv/kv|\vec{r}-\vec{r}'|)dv'-(1/4\pi)*\oint_s(qs|\vec{r}-\vec{r}'|\cdot\hat{n}/ks|\vec{r}-\vec{r}'|)da'.$$

2. The method of claim 1, wherein when the reference point is one of the observation points, the heat convection temperature difference is calculated according to the power density function, the thermal conductivity coefficient and the distance vector.

3. The method of claim 2, wherein the step of calculating the heat convection temperature difference further comprises performing surface integration on the isothermal surface enclosing the volume according to the power density function, the thermal conductivity coefficient and the distance vector.

4. The method of claim 3, wherein the power density function comprises a surface power density function qs, the thermal conductivity coefficient comprises a surface thermal conductivity coefficient ks, the location of each of the observation points is r, the location of the reference point is r', a unit normal vector of the isothermal surface is n̂, the surface is a, and the heat conduction temperature difference is expressed as:

$$\Delta T=(1/4\pi)*\oint_s(qs|\vec{r}-\vec{r}'|\cdot\hat{n}/ks|\vec{r}-\vec{r}'|)da'.$$

5. The method of claim 1, wherein the space between the reference point and each of the observation points is a part of the propagation path, and at least one of the electronic modules is located at the space, wherein the thermal conductivity coefficient is related to the material of the electronic modules.

6. The method of claim 1, further comprising:
establishing an equivalent electrothermal circuit model on the basis of the electronic modules and the electrothermal network π model, wherein the equivalent electrothermal circuit model comprises a plurality of heat resistances; and calculating the heat resistances according to the power density function, the thermal conductivity coefficient and the distance vector.

7. The method of claim 1, wherein the heat source has the highest temperature in the electronic system and the common base has the lowest temperature in the electronic system.

8. A non-transitory computer readable medium storing a computer program having code to execute a method for thermal analysis modeling, wherein the method comprises:

establishing an electrothermal network π model on the basis of a plurality of electronic modules of an electronic system to define a heat source, at least one propagation path and a common base of the electronic system;

defining a plurality of observation points in the electronic system, wherein each of the observation points is located at an isothermal surface enclosing a volume surrounding a reference point, where the reference point is the heat source or one of the observation points;

calculating a heat conduction temperature difference and a heat convection temperature difference according to a power density function of the reference point, a thermal conductivity coefficient and a distance vector between the reference point and each of the observation points; and establishing a temperature distribution of the electronic system according to the heat conduction and the heat convection temperature differences and a defined temperature of the common base, wherein when the reference point is the heat source, the heat conduction temperature difference is calculated according to the power density function, the thermal conductivity coefficient and the distance vector, wherein the step of calculating the heat conduction temperature difference further comprises performing volume integration on the volume surrounding the reference point and surface integration on the isothermal surface enclosing the volume according to the power density function, the thermal conductivity coefficient and the distance vector, wherein the power density function comprises a volume power density function qv and a surface power density function qs, the thermal conductivity coefficient comprises a volume thermal conductivity coefficient kv and a surface thermal conductivity coefficient ks, the location of each of the observation points is r, the location of the reference point is r', a unit normal vector of the isothermal surface is $\hat{n}$, the surface is a, and the heat conduction temperature difference is expressed as:

$$\Delta T = (1/4\pi) * \int_v (qv/kv|\bar{r}-\bar{r}'|)dv' - (1/4\pi) * \oint_s (qs|\hat{r}-\hat{r}'|\cdot\hat{n}/ks|\bar{r}-\bar{r}'|)da'.$$

9. The non-transitory computer readable medium of claim 8, wherein when the reference point is one of the observation points, the heat convection temperature difference is calculated according to the power density function, the thermal conductivity coefficient and the distance vector.

10. The non-transitory computer readable medium of claim 9, wherein the step of calculating the heat convection temperature difference further comprises performing surface integration on the isothermal surface enclosing the volume according to the power density function, the thermal conductivity coefficient and the distance vector.

11. The non-transitory computer readable medium of claim 9, wherein the power density function comprises a surface power density function qs, the thermal conductivity coefficient comprises a surface thermal conductivity coefficient ks, the location of each of the observation points is r, the location of the reference point is r', a unit normal vector of the isothermal surface is $\hat{n}$, the surface is a, and the heat conduction temperature difference is expressed as:

$$\Delta T = (1/4\pi) * \oint_s (qs|\hat{r}-\hat{r}'|\cdot\hat{n}/ks|\bar{r}-\bar{r}'|)da'.$$

12. The non-transitory computer readable medium of claim 8, wherein the space between the reference point and each of the observation points is a part of the propagation path, and at least one of the electronic modules is located at the space, wherein the thermal conductivity coefficient is related to the material of the electronic modules.

13. The non-transitory computer readable medium of claim 8, wherein the method further comprises:

establishing an equivalent electrothermal circuit model on the basis of the electronic modules and the electrothermal network π model, wherein the equivalent electrothermal circuit model comprises a plurality of heat resistances; and calculating the heat resistances according to the power density function, the thermal conductivity coefficient and the distance vector.

14. The non-transitory computer readable medium of claim 8, wherein the heat source has the highest temperature in the electronic system and the common base has the lowest temperature in the electronic system.

* * * * *